United States Patent [19]

Haines

[11] Patent Number: 4,733,710

[45] Date of Patent: Mar. 29, 1988

[54] VEHICULAR SHADE

[76] Inventor: Richard K. Haines, 2317 W. Lexington Ave., Elkhart, Ind. 46515

[21] Appl. No.: 785,800

[22] Filed: Oct. 9, 1985

[51] Int. Cl.<sup>4</sup> ............................................. E06B 3/94
[52] U.S. Cl. .................................. 160/84.1; 160/279; 160/107
[58] Field of Search ................ 160/84 R, 115, 178 C, 160/120, 121 C, 166, 174, 176 R, 177, 107, 279, 167; 343/745, 900; 49/64, 168

[56] References Cited

U.S. PATENT DOCUMENTS

| | | | |
|---|---|---|---|
| 2,075,462 | 3/1937 | Parmenter | 160/115 |
| 2,094,475 | 9/1937 | Schwarzhaupt | 343/715 |
| 2,146,182 | 2/1939 | Guyer | 160/84 R |
| 2,836,237 | 5/1958 | Hogin et al. | 160/115 |
| 3,818,969 | 6/1974 | Debs | 160/172 X |
| 4,202,395 | 5/1980 | Heck et al. | 160/84 R |
| 4,212,341 | 7/1980 | Fisher | 160/84 R |
| 4,347,887 | 9/1982 | Brown | 160/84 R |
| 4,444,239 | 4/1984 | Haines | 160/107 |
| 4,473,101 | 9/1984 | Langeler | 160/84 R |
| 4,557,309 | 12/1985 | Judkins | 160/279 |
| 4,574,864 | 3/1986 | Tse | 160/279 X |

FOREIGN PATENT DOCUMENTS

61284  9/1943  Denmark ........................ 160/84 R

Primary Examiner—Ramon S. Britts
Assistant Examiner—David M. Purol
Attorney, Agent, or Firm—Trexler, Bushnell, Giangiorgi & Blackstone, Ltd.

[57] ABSTRACT

A shade construction for a vehicle window having a generally rectangular window frame comprises a pair of flexible cords running respectively from top to bottom edges of the window frame. Substantial portions of these cords are in parallel, spaced apart condition and located adjacent and parallel to opposite lateral sides of the frame. A shade structure comprises a header and a pleated shade member coupled to the header. The pleated shade member is slideably mounted to the pair of cords generally at opposite sides thereof so as to be expandable and collapsible in accordion-like fashion relative to the cords. Mounting structure is provided for slideably mounting the header to the cords, and for directing the cords through the header and into slideable engagement with the pleated shade member. This mounting structure maintains some frictional engagement with the cords for permitting the headers to be set at a desired orientation along the cords and relative to said window while otherwise facilitating holding of the header against movement relative to the cords in response to vibration or the like.

17 Claims, 15 Drawing Figures

VEHICULAR SHADE

BACKGROUND OF THE INVENTION

This invention relates generally to window shades and more particularly to a window shade construction for mounting a window shade within a frame unit for use in a vehicle such as a van.

The prior art has proposed a number of venetian blind-type window coverings for use in vehicular or van windows. Such venetian blind constructions are shown for example in my prior U.S. Pat. Nos. 4,444,239 and 4,506,476. These prior U.S. Patents illustrate venetian blind assemblies which are attachable respectively to a vehicle window frame and directly to the glass or other transparent member of the window itself. In the latter case, the window may be hingedly mounted for opening and closing relative to the fixed frame and vehicle wall, whereby the window blind attached thereto moves with the window.

In this regard, window blinds in accordance with some other prior art constructions were permitted to depend or hang from only a top portion of the window or frame. The freely depending or hanging portions of such blinds tend to move about considerably, striking the vehicle or extending into the interior of the vehicle, as the vehicle accelerates, decelerates, pitches and rolls during travel. These latter type of depending or hanging blinds or other window coverings are generally undesirable for this reason.

The prior art, has therefore provided for attachment of window blinds at both top and bottom parts of either the window or window frame to avoid the foregoing drawbacks of depending or hanging blinds. It has also proposed relatively rigid constructions to avoid deformation of the blinds due to wind or the like. Such rigid constructions are illustrated in my above-referenced U.S. Patents.

The present invention provides a shade-type of window covering as an alternative to the venetian blind-type of window covering discussed hereinabove. However, it will be appreciated that some of the same considerations as to resistance to deformation while in use, as well as the avoidance of hanging or depending structures are applicable to such a shade-type of structure as well.

As an additional matter, it is also often desirable when using window shades to provide for continuously variable positioning of the shade relative to the window. That is, the shade preferably should be movable to positions respectively substantially fully covering the window and fully exposing the window and also adjustable to any desired position therebetween. Moreover, it is often desirable to provide a translucent type of shade for daytime use for permitting outside light to enter the vehicle while preventing visual observation of the interior of the vehicle from the outside. On the other hand, for nighttime use, it is desirable to utilize opaque shades for preventing viewing of a lighted vehicle exterior from the unlighted exterior thereof.

OBJECTS AND SUMMARY OF THE INVENTION

Accordingly, it is a general object of the invention to provide a novel and improved window shade construction suitable for use with a vehicle such as a van.

A more specific object is to provide a vehicular window shade construction in accordance with the foregoing object which presents no hanging or depending portions relative to the window.

A related object is to provide a vehicular window shade construction in accordance with the foregoing objects which is continuously variably positionable between positions for respectively substantially fully covering and fully exposing the vehicle window.

A further related object is to provide a window shade in accordance with the foregoing objects which permits selectively extendable and collapsible translucent and opaque portions for respective daytime and nighttime use.

Briefly, and in accordance with the foregoing objects, a shade construction for a vehicle window having a generally rectangular window frame in accordance with the invention comprises a pair of flexible cords running respectively from top to bottom edges of said window frame, substantial portions of said cords being in parallel, spaced apart condition and located adjacent and parallel to opposite lateral sides of said frame; a shade structure comprising a header and a pleated shade member having one end coupled to said header; cord receiving means for slideably mounting said pleated shade member to said pair of cords generally at opposite sides thereof so as to be expandable and collapsible in accordion-like fashion relative to said cords, and mounting means coupled to said headers for slideably mounting said header to said cords, and for directing said cords through said header and into slideable engagement with said pleated shade member; said mounting means maintaining some frictional engagement with said cords for permitting said header to be set at a desired orientation along said cords and relative to said window while otherwise facilitating holding of said header against movement relative to said cords in response to vibration or the like.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figures 1, 2, 3, 4:
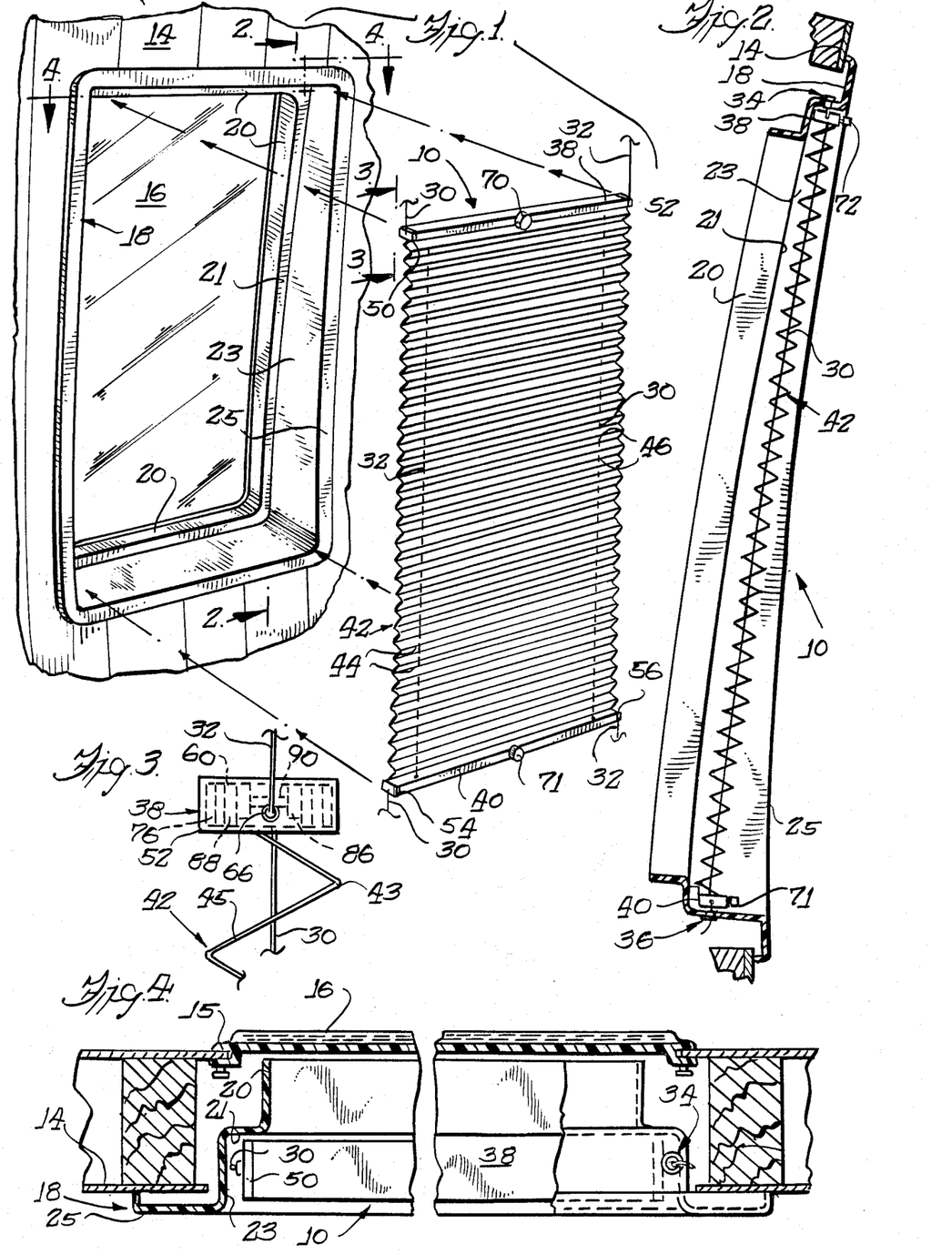
FIG. 1 is an exploded perspective view, illustrating a window frame unit and an associated shade construction in accordance with the invention.
FIG. 2 is a somewhat enlarged sectional view taken generally along the line 2—2 of FIG. 1.
FIG. 3 is a further enlarged partial sectional view taken generally along the line 3—3 of FIG. 1.
FIG. 4 is an enlarged partial sectional view taken generally along the line 4—4 of FIG. 1.

Referring now to the drawings and initially to FIGS. 1 and 2, a window shade construction in accordance with the invention is indicated generally by the reference numeral 10. This window shade construction is suitable for use with a window designated generally by reference numeral 12, which may comprise a window of a van or similar vehicle. This window 12 is set into an exterior wall portion 14 of the van or other vehicle.

The window 12 includes a generally rectangular transparent glazing panel 16 which is fitted to a receiving, generally rectangular frame member designated generally by reference numeral 18. The details of the structure of the window 12 including the frame 18 and glazing panel 16 and its assembly with the wall 14 are fully set forth in my prior U.S. Pat. No. 4,444,239 to which reference is invited. Suffice it to say that the frame 18 is generally upwardly and inwardly inclined having surrounding walls 20 for lining a vehicle window opening 15 (see FIG. 4) upwardly and inwardly extending vehicle wall 14 as best viewed in FIG. 1. The corresponding upward and inward inclination of frame 18 is also apparent in FIG. 2. The walls 20 project generally outwardly into a shoulder portion 21 which in turn extend into generally flat sidewall portions 23 which overlie the interior of the opening 15 and vehicle wall 14. These sidewall portions 23 extend into flange portions 25 which extend outwardly and abut an inner face of the vehicle wall 14.

Turning now more particularly to the window shade construction 10, a pair of flexible cords 30, 32 run from top to bottom of the window 12. These cords 30 and 32 are attached at respective top and bottom edges, and preferably at corners, of the window frame 18 by grommets 34 and 36 shown in FIGS. 2, 3 and 5 extending through apertures in the frame. The cords 30 and 32 are arranged such that substantial portions thereof are locatable in a parallel and spaced apart condition adjacent and parallel to opposite lateral sides of the frame 18.

The window shade construction 10 also includes a shade structure comprising similar top and bottom header members 38 and 40, and a pleated shade member 42 coupled intermediate the top and bottom headers. Preferably, the pleated shade 42 comprises an accordion-pleated shade member, that is, one having a plurality of pleats or folds 43 extending in alternating opposite directions at substantially equal intervals therealong. Hence, shade segments 45 of substantially equal dimensions are defined between respective adjacent pleats 43.

Cord receiving means, which in the illustrated embodiment comprise a plurality of aligned through apertures 44 in respective segments 43 of the pleated shade 42 slideably mount the pleated shade to the cords 30 and 32. In this regard the through apertures 44 and 46 (see also FIG. 5) are located generally spaced apart and adjacent opposite lateral sides of the pleated shade 42 such that the pleated shade is expandable and collapsible in accordion-like fashion relative to the cords. Additional mounting means including respective end caps 50, 52 and 54, 56 which are coupled to the headers 38 and 40 for mounting the headers for slideable movement along the cords 30 and 32. In this regard, these end caps are configured for receiving and directing the respective cords 30 and 32 therethrough and into slideable engagement with the pleated shade member 42.

Moreover, as will be more fully described hereinafter, the mounting means, including the end caps 50, 52 and 54, 56, are arranged to maintain some degree of frictional engagement between the headers 38 and 40 and the cords 30, 32. This frictional engagement is such as to permit the headers to be slideably moved upwardly and downwardly along the cords 30, 32 and set at any desired orientation along the cord relative to the window 16, while otherwise facilitating the holding of the headers 38 and 40 against further movement relative to the cords in response to vibration of the vehicle or like extraneous forces. That is, only positive gripping of the respective headers 38, 40 and urging thereof upwardly or downwardly relative to cords 30 and 32 accomplishes repositioning of the headers 38, 40 and hence of the pleated shade member 42 relative to the window 16. Hence, forces encountered while the van is in motion, for example such as vibration, wind or other forces are generally not sufficient to overcome the frictional engagement between the headers and cords so as to disturb the relative positions of the headers once they have been manually set.

Figures 5, 6, 7, 10, 11:
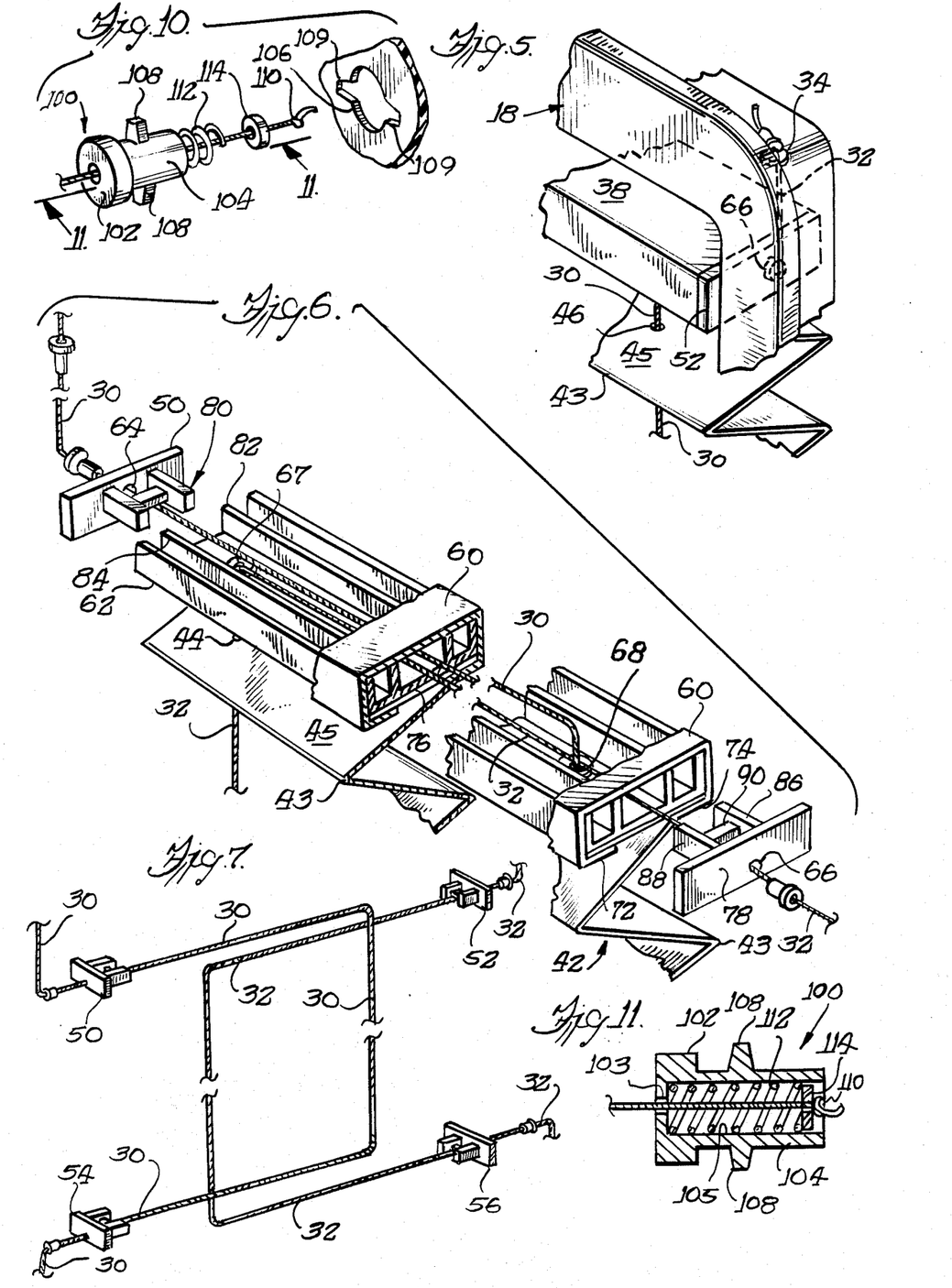
FIG. 5 is a partially exploded perspective view illustrating assembly of some of the parts of the shade construction in accordance with the invention.
FIG. 6 is a partial perspective view illustrating further details of the shade construction and its mounting to the window frame of FIG. 1.
FIG. 7 is a somewhat simplified view in diagrammatic form, illustrating a preferred routing of cord elements of the shade construction of the invention.
FIG. 10 is a fragmentary exploded perspective view showing mans for attaching cord elements to the shade construction.
FIG. 11 is an enlarged sectional view taken along line 11—11 in FIG. 10.

Referring now also to FIGS. 5 through 7, further details of the foregoing structure will now be described. The headers 38 and 40 are substantially identical, whereby only the top header 38 will be described. The header 38 comprises an elongate, hollow, open-ended member defined generally by a pair of channel members 60, 62. In this regard, "inner" channel member 62 will be seen to slideably interfit within "outer" channel member 60, as best viewed in FIG. 6. The mounting means including end caps 50 and 52 further comprises a through aperture 64, 66 in each of these end caps for receiving one of the cords 30, 32 therethrough. Moreover, this mounting means includes a pair of second through apertures formed in the surface or side of the header 38 which faces the pleates shade member 42. These second through apertures 67, 68 are formed adjacent opposite ends of the header 38, and more particularly, through the undersurface of channel 62 so as to align with the through apertures 44 and 46 in the segments 45 of the pleated shade member 42. Hence these latter apertures 67 and 68 are positioned for directing the respective cords 30 and 32 to the through apertures 44 and 46 of the pleated shade. Accordingly, some degree of frictional engagement is thereby defined between the header and the cords as the cords are bent at substantially right angles to extend interiorly of the header from each of the end caps and again to extend through the second through apertures 67 and 68 in the header.

In accordance with the preferred form of the invention illustrated, and as diagrammatically indicated in FIG. 7, each of the respective cords 30 and 32 is disposed extending through the hollow interior of the header 38 from one of the end caps thereof to the through aperture 66 or 68 adjacent the end of the header generally opposite the end cap from which it started. This arrangement further enhances the frictional engagement between each said header and each of the cords. That is to say, as shown in FIGS. 5 and 7, the cords are effectively crossed over each other within each of the headers 38 and 40, such that cord 30 which is attached to the upper and lower left-band edges or corners of the frame 18 as viewed in FIG. 1 passes through the through apertures in the right-hand side of the pleated shade member 42. Similarly, the cord 32 which is coupled to the upper and lower right-hand edges or corners of the frame 18 as viewed in FIG. 1 passes through the through apertures 44 at the left-hand side of the pleated shade 42 as viewed in FIG. 1.

Hence, each cord, such for example as the cord 30, is folded or bent substantially right angles in at least four places as it passes through the respective end caps and headers, to define a substantial amount of contact therebetween for frictional engagement. Moreover, it will be appreciated that the respective cords 30 and 32 are pulled into a relatively taut condition as they are coupled to the respective corners of the frame 18. Hence, the substantially straight, parallel and spaced segments or sections of the cord upon which the pleated shade member 42 rides are pulled substantially taut. This taut condition helps the shade structure resist forces such as wind or the like which would otherwise tend to distort or move the shade away from window 16, thus holding the shade, when in a closed or extended condition substantially within the frame member 18, as best viewed in FIG. 2.

In this regard, the cords 30 and 32 are sufficiently flexible to be respectively passed through the hollow interiors of the headers and between the respective end caps and through apertures thereof. Thereupon, the cords are pulled substantially taut, as just mentioned, intermediate the end cap apertures and header apertures and are also pulled taut intermediate the end cap apertures and their points of attachment to the upper and lower edges of the frame 18.

Figures 8, 9, 12, 13, 14, 15:
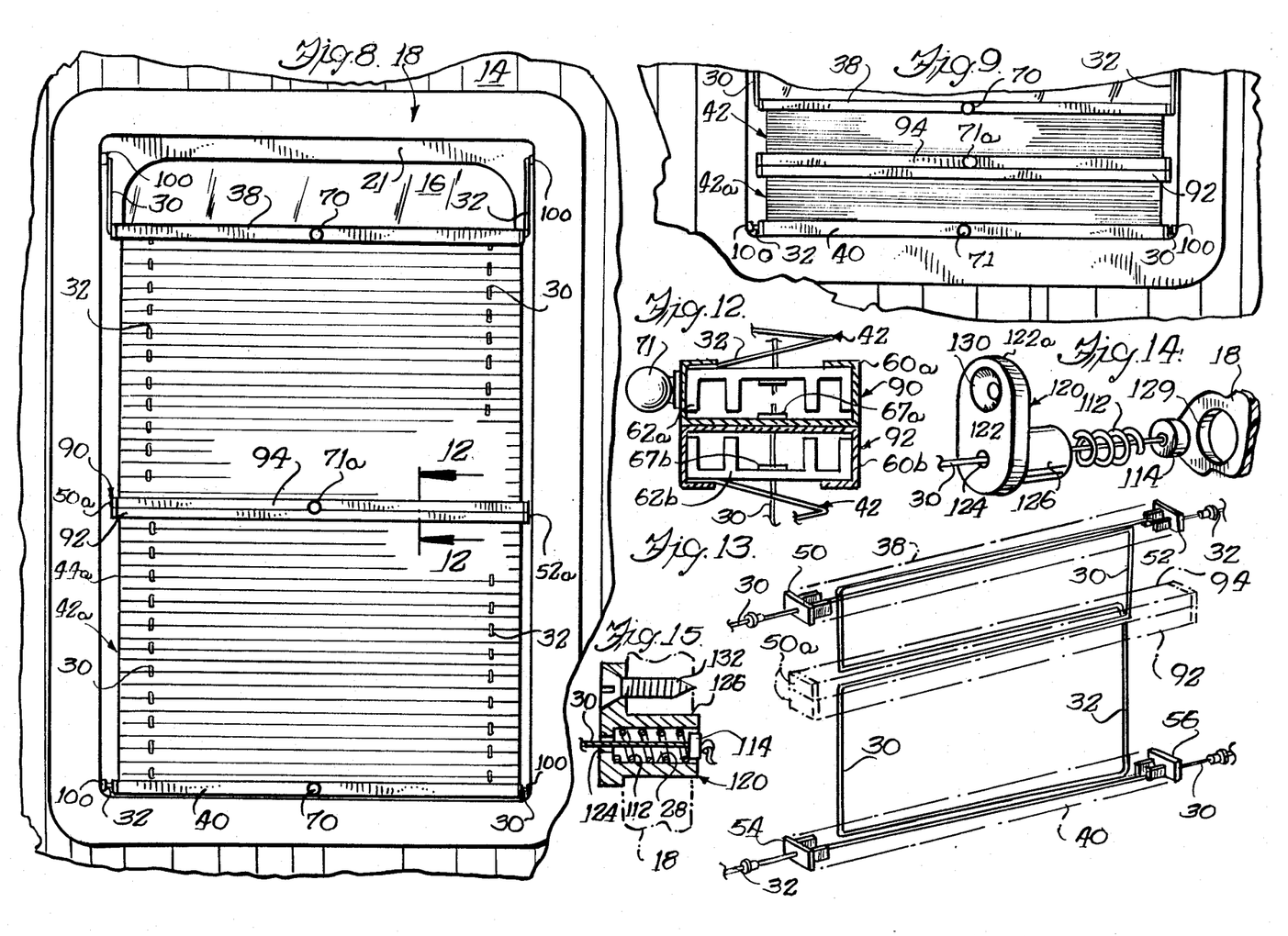
FIG. 8 is a front plan view of a shade construction in accordance with an alternate embodiment of the invention.
FIG. 9 is a partial front plan view of a portion of a shade construction in accordance with the embodiment of FIG. 8.
FIG. 12 is an enlarged sectional view taken along line 12—12 in FIG. 8.
FIG. 13 is a view similar to FIG. 7, showing a preferred cord writing in the embodiment of FIG. 8.
FIG. 14 is a fragmentary exploded perspective view showing an alternate form of the attaching means of FIG. 10.
FIG. 15 is a sectional view taken generally along line 15—15 in FIG. 14.

As an additional matter, it will be noted that as the shade is being collapsed or retracted, as best viewed in FIGS. 8 and 9, the thus exposed portions of the cords 30 and 32 are disposed relatively closely adjacent the respective inner surfsces 23 of the frame 18 and well behind outer flange portion 25. This substantially avoids accidental snagging or other contact with the exposed portions of cords 30 and 32 when the pleated shade member is in a partially or fully collapsed or retracted position. It will be seen that the coupling of the respective outer ends of these cords at or near the respective corners of the frame 18, together with the running of the cords through the end apertures 64 and 66 at outer ends of the respective end caps cooperate to define this positioning of exposed portions of the cords relatively close to the surfaces 23 as just described.

In the embodiment illustrated in FIGS. 1 through 7, and in FIG. 9, the upper and lower headers 38 and 40 are each slideably movable relative to the cords 30, 32. To facilitate this slideable movement of the headers for desired placement of the pleated shade member 42 relative to the window 16 additional gripping means or members such as knobs 70, 71 are additionally provided on each of the headers. Alternatively, one of the two headers 38 and 40 may be coupled by a bracket or other suitable means to the respective top or bottom edge of the frame 18, such that only one of the headers 38, 40 is slideably movable relative to the cords 30, 32.

As best viewed in FIGS. 5 and 6, each of the headers also includes means for engaging the respective facing end portions or segments of the pleated shade member 42. In this regard, the respective outer and inner channel members 60 and 62 interfit as mentioned above. The outer channel member 60 will be seen to have a pair of inwardly extending flange portions 72, 74 which extend over the undersurface 76 of inner channel member 62 so as to grippingly engage the pleated shade member endmost portion or segment 45 therebetween.

Referring to FIG. 5, each of the end caps will be seen to comprise a generally rectangular end portion 78 having an outwardly extending strut portion 80 configured for extending into and engaging one of the header open ends for complementary frictional engagement therewithin. In this regard, the inner channel member 62 is provided with a pair of parallel, spaced apart interior wall portions 82, 84. Cooperatively, the strut 80 is defined by a pair of parallel and spaced apart legs 86, 88 and an intermediate strut or support member 90 running therebetween. These legs 86 and 88 are spaced apart for interfitting between respective walls 82, 84 in a close, frictional engagement therewith.

Referring now to FIGS. 8 through 13, in accordance with an alternate embodiment of the invention, a second pleated shade member 42a may also be provided slideably mounted to the cords 30, 32. In the embodiment of FIG. 8, facing ends of the first and second pleated shade members are joined together by further, intermediate header structure 90 which preferably includes a pair of headers 92, 94 in back-to-back arrangement. Each header 92, 94 is substantially similar in details of its construction to the headers 38, 40 described above with reference to FIGS. 1 through 6, like parts being designated by like reference numerals with suffixes a and b. These intermediate headers 92 and 94 thereby engage respective facing end portions or segments of the two pleated shade members 42 and 42a in the same way as described above with respect to the headers 30 and 40. Accordingly, each of these pleated shade members 42 and 42a is extendable and collapsible in response to corresponding movement of one or more of the headers 38, 40 and/or 90 for covering or exposing any desired portions of the window 16 including substantially the entire window.

If desired, the bottommost header 40 in the embodiment of FIG. 8 may be coupled by suitable means to a bottom portion of the frame 18, so as to permit relative slideable movement along the cords 30 and 32 by only the intermediate header construction 90 and top header 38. In this regard, the intermediate header 90 also includes mounting means for slideably frictionally engaging the cords 30 and 32. Preferably, the cords are similarly "crossed over" and directed through header 90 (see FIG. 13) so as to permit this intermediate header 90 to be set to any desired position relative to the window. Hence, each of shades 42 and 42a may be set to any desired position between the respective fully extended and fully retracted or collapsed positions thereof.

Since each of the intermediate headers 92, 94 is substantially similar to the headers 38, 40 described above, it will be appreciated that the respective through apertures 67 and 68 as illustrated in FIG. 5 are also provided at the respective outwardly oppositely facing surfaces of these intermediate headers 92 and 94. Accordingly, these through apertures are aligned with the through apertures 44, 46 and 44a, 46a of the respective pleated shades 42 and 42a. (In this regard, the second pleated shade member 42a includes through apertures 44a and 46a for receiving the cords therethrough). Moreover, each of the cords 30 and 32 is directed through one of the through apertures of the intermediate header structure 90 at one end of a first one of these oppositely facing surfaces and through the elongate hollow body thereof to and through one of the through apertures at an opposite end of the other oppositely facing surface. That is, as indicated in FIG. 13, the cords 30 and 32 are again crossed over within the hollow body of intermediate header structure 90 to facilitate frictional engagement therebetween.

Accordingly, while end caps 50a 52a are provided for respective headers 92 and 94, these end caps have no through apertures therein, since the cords 30, 32 are not directed through the end caps of the intermediate headers 92, 94. In this regard, it will also be recognized that suitable aligned through apertures are also provided in the abutting surfaces of outer channel members or portions 60a, 60b of each of the intermediate headers 92, 94 to permit passage of the cord therebetween.

In accordance with a preferred form of the embodiment of FIGS. 8 through 13, one of the pleated shade members 42, 42a is constructed of a translucent or screen-like material, while the other thereof is constructed of an opaque material.

In this embodiment, fastening means or grommets 100 are provided for releaseably securing the ends of the cords to the window frame. As shown best in FIGS. 10 and 11, each grommet has a head 102 having an aperture 103 therethrough. A shank 104 with an enlarged bore 105 extends axially from the head for insertion through a hole 106 in the window frame. Ears 108 project laterally from the shank. The hole 106 is formed with radially projecting slots 109 through which the ears may pass. Upon rotation of the grommet in the hole 106, the ears engage behind the frame for releaseably securing the grommet in assembled relationship with the frame. The cord is secured to the grommet by inserting a portion thereof through the central aperture 103 and then tying a knot 110 in the end. Preferably, a spring 112 is disposed in the bore 105 and acts against an apertured disc 114 through which the cord extends to be knotted at the opposite surface thereof in order to maintain the cord under tension.

It is noted that with the grommets secured to the sidewalls of the frame, the cords are located close to the sidewalls in positions overlying the window opening-defining frame shoulder 21. In this position the cords do not interfere with the window opening and are also substantially protected from accidental injury. While the releasably mountable grommets are shown mounted in the frame sides in the embodiment of FIGS. 8 through 13, it is to be understood that they could also be secured at or near the top and bottom corner positions of the frame as in the embodiment of FIGS. 1 through 5.

Referring now to FIGS. 14 and 15, an alternate form of the grommet or grommet-like attaching member and related structure of FIGS. 10 and 11 is illustrated. This alternate structure comprises an attaching or fastening means or grommet designated generally by the reference numeral 120. The grommets of the form shown in FIGS. 14 and 15 may most advantageously be utilized in connection with the window shades as illustrated in FIGS. 2 and 4, for coupling the respective cords, 30, 32 to top and bottom edges of the frame 18.

The fastening means or grommet 120 includes an enlarged head portion 122 having an aperture 124 therethrough. A shank 126 with an enlarged bore 128 extends from this head 122 for insertion through a hole 129 in the window frame. In order to secure the grommet or attaching member 120 to the window frame, an additional outwardly extending portion or extension 122a is provided for the head 122 and a further through bore or aperture 130 is formed in this extension 122a, for receiving a fastener, such as a threaded screw member 132 therethrough.

The screw member 132 may be of a self-tapping type as illustrated to hold the fastening member 120 to the window frame, or alternatively, a mating fastener such as a nut (not shown) may be utilized.

As in the embodiment of FIGS. 10 and 11, a spring 112 is disposed in the bore 128 and acts against a apertured disc 114 through which the cord extends to be knotted at the opposite surface thereof. This arrangement maintains the cord under tension in the same fashion described above with respect to the embodiment of FIGS. 10 and 11. Preferably, the grommets 120 are secured at or near the corners of the frame so as to locate the cords relatively closely adjacent the sidewalls and in positions overlying the frame shoulders 21. As previously mentioned, this arrangement maintains any exposed portions of the cords in a position so as not to interfere with the window opening and also so as to protect the cords from any accidental damage.

While particular embodiments of the invention have been shown and described in detail, it will be obvious to those skilled in the art that changes and modifications of the present invention, in its various aspects, may be made without departing from the invention in its broader aspects, some of which changes and modifications being matters or routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A window shade construction for a window having a generally rectangular window frame, said shade construction comprising: a pair of flexible cords running from top to bottom of said window and attached adjacent respective top and bottom ends of said window frame; substantial portions of said cords being locatable in a parallel and spaced apart condition adjacent and parallel to opposite lateral sides of said frame; a shade structure comprising a header movable toward and away from either of said ends of the frame, and a pleated shade member having one end coupled to said header; cord receiving means for mounting said shade member to said pair of cords generally at opposite sides thereof for relative slideable movement so as to be expandable and collapsible in accordion-like fashion relative to said cords; and mounting means coupled to said header for mounting said header for slideable movement along said cords and for directing said cords through said header and into said relative slideable engagement with said pleated shade member; said mounting means including engaging means for maintaining sufficient frictional engagement of said header with said cords for permitting said header to be set at a desired orientation along said cords relative to said window and for holding of said header in said desired orientation and against unintended movement relative to said cords in response to vibration or the like; wherein said cord receiving means for mounting said pleated shade members to said cords comprises a plurality of aligned through apertures in respective segments of said pleated shade member and adjacent each of opposite lateral edges thereof; and further including a second header connected to an end of said shade member opposite from said first-mentioned header; wherein each of said headers comprises an elongate, hollow, open-ended member, and wherein said mounting means comprises an end cap affixed to either end of each of said headers, each said end cap having a through aperture for receiving one of said cords therethrough to thereby direct exposed portions of said cords along and closely adjacent to respective sidewalls of said window frame for attachment adjacent top and bottom corners thereof to substantially avoid accidental snagging of or other contact with the cords; wherein said engaging means further includes a pair of second through apertures formed in a surface of each of said headers which faces said pleated shade member, each of said second through apertures being aligned with the respective through apertures at one side of said pleated shade member for directing said cord from one of said end caps to said pleated shade through apertures and thereby defining said frictional engagement between said header and said cords as said cords extend interiorly of said header from each said end cap to each said second through aperture therein; and wherein said engaging means are further defined by said cords being respectively disposed extending through said hollow interior of each header and directed from each of said end caps thereof to the through aperture adjacent the opposite end of each said header to thereby further enhance said frictional engagement between each said header and each of said cords; and wherein said pleated shade member includes a first, upper section and a second, lower section; said construction further including at least one intermediate header slideably engaged with said cords intermediate said first and second mentioned headers and engaging respective facing end portions of the first and second pleated shade member sections; each of said pleated shade member sections thereby being respectively extendable and collapsible in response to corresponding movement of one or more of said headers for alternately covering or exposing any desired portion of said window, up to and including substantially the entire window.

2. A shade construction according to claim 1 and further including means for holding one of said headers in a fixed position relative to said window.

3. A shade construction according to claim 1 wherein each of said headers further includes means for attaching thereto an end portion of said pleated shade member.

4. A shade construction according to claim 3 wherein each of said headers comprises elongate, interfitting inner and outer channel members, each said outer channel member having flange means extending over a predetermined surface portion of said inner channel member for grippingly engaging one said pleated shade member end portion therebetween and comprising said attaching means.

5. A shade construction according to claim 1 wherein each of said end caps includes an outwardly extending strut portion configured for extending into one of said header open ends for complementary frictional engagement therewithin.

6. A shade construction according to claim 1 wherein said intermediate header includes mounting means for slideably frictionally engaging said cords so as to permit each of said pleated shade member sections to be set to any desired position from a fully collapsed position to a fully extended position relative to said window.

7. A shade construction according to claim 1 wherein a selected one of said first and second mentioned headers is affixed adjacent a correspondingly selected one of said top and bottom edges of said window frame so as to permit the extending and collapsing of both of said pleated shade members from the selected one of said top and bottom edges of said window frame.

8. A shade construction according to claim 7 wherein said intermediate header comprises a pair of substantially identical, oppositely facing headers coupled together in a back-to-back configuration and wherein each of said oppositely facing headers includes means for grippingly engaging end portions of one of said pleated shade members.

9. A shade construction according to claim 6 wherein said second pleated shade member section includes a plurality of through apertures adjacent either lateral edge thereof aligned with the through apertures of said first pleated shade member section and wherein said intermediate header comprises an elongate hollow body including means for frictionally engaging said cord, said frictional engaging means comprising respective pairs of through apertures at oppositely facing surfaces of said intermediate header and aligned with the through apertures of said pleated shade; each of said cords being directed through one of said through apertures of said intermediate header at one end of a first of said oppositely facing surfaces thereof and through said elongate hollow body thereof to and through one of said through apertures at an opposite end of the other of said oppositely facing surfaces, to thereby define frictional engagement between said intermediate header and said cords.

10. A shade construction according to claim 1 and further including gripping means on at least selected ones of said headers to facilitate manual gripping thereof for slideable movement relative to said cords.

11. A shade construction according to claim 1 wherein one of said pleated shade member sections is constructed of a translucent material and the other of said pleated shade member sections is constructed of an opaque material.

12. A window shade construction according to claim 1 wherein said flexible cords are sufficiently flexible to be respectively passed through said hollow interior and between the respective end caps and through apertures, and are pulled substantially taut intermediate said end cap apertures and header apertures and also pulled taut intermediate said end cap apertures and the points of attachment thereof adjacent the upper and lower ends of said frame member, respectively.

13. The combination according to claim 1 which further includes grommet means for attaching at least one end of one of said cords to said window frame, each of said grommet means comprising a head having a aperture axially therethrough, a shank extending axially from said head through said window frame, said shank having an axial bore therethrough, an end portion of an associated cord extending axially through said head and said shank, and spring means disposed in said bore for maintaining said associated cord under tension.

14. In combination, a generally rectangular window frame for mounting in a vehicle window opening and a window shade construction for fitting in said window frame with clearance; said window shade construction comprising: a pair of flexible cords running from top to bottom of said window frame and attached adjacent respective top and bottom edges of said window frame; substantial portions of said cords being locatable in a parallel and spaced apart condition adjacent and parallel to opposite lateral sides of said frame; a shade structure comprising similar top and bottom headers and a pleated shade member coupled to and intermediate said top and bottom headers; cord receiving means for slideably mounting said shade member to said pair of cords generally at opposite sides thereof so as to be expandable and collapsible in accordion-like fashion relative to said cords; and mounting means coupled to said headers for mounting said headers for slidable movement along said cords and for directing said cords through said headers and into said slideable engagement with said pleated shade member; said mounting means including engaging means for maintaining sufficient frictional engagement between said headers and said cords for permitting each of said headers to be set at a desired orientation along said cords relative to said window and for holding said headers in the desired orientations and against unintended movement relative to said cords in response to vibration or the like; wherein said cord receiving means for mounting said pleated shade members to said cords comprises a plurality of aligned through apertures in respective segments of said pleated shade member and adjacent each of opposite lateral edges thereof; and further including a second header connected to an end of said shade member opposite from said first-mentioned header; wherein each of said headers comprises an elongate, hollow, open-ended member, and wherein said mounting means comprises an end cap affixed to either end of each of said header, each said end cap having a through aperture for receiving one of said cords therethrough to thereby direct exposed portions of said cords along and closely adjacent to respective sidewalls of said window frame for attachment adjacent top and bottom corners thereof to substantially avoid accidental snagging of or other contact with the cords; wherein said engaging means further includes a pair of second through apertures formed in a surface of each of said headers which faces said pleated shade member, each of said second through apertures being aligned with the respective through apertures at one side of said pleated shade member for directing said cord from one end of said caps to said pleated shade through apertures and thereby defining said frictional engagement between said header and said cords as said cords extend interiorly of said header from each said end cap to each said second through aperture therein; and wherein said engaging means are further defined by said cords being respectively disposed extending through said hollow interior of each header and directed from each of said end caps thereof to the through aperture adjacent the opposite end of each said header to thereby further enhance said frictional engagement between each of said header and each of said cords; and wherein said pleated shade member includes a first, upper section and a second, lower section; said construction further including at least one intermediate header slideably engaged with said cords intermediate said first and second mentioned headers and engaging respective facing end portions of the first and second pleated shade member sections; each respectively extendable and collapsible in response to corresponding movement of one or more of said headers for alternately covering or exposing any desired portion of said window, up to and including substantially the entire window.

15. The combination according to claim 14 wherein said window frame includes opposite sidewalls respectively including inwardly projecting shoulder portions defining opposite edges of the window opening, said headers and said shade member having opposite side portions overlying said shoulder portions, and said exposed portions of said cords respectively being located at positions overlying said shoulder portions to thereby direct exposed portions of said cords along and closely adjacent to respective sidewalls of said window frame for attachment adjacent top and bottom corners thereof to substantially avoid accidental snagging of or other contact with the cords.

16. The combination according to claim 14 which further includes attachment means for detachably securing ends of said cords to said window frame, said attachment means including an apertured grommet for receiving an end of one of said cords, said grommet including a shank portion extending through a hole in said window frame and ear means projecting from said shank and releaseably engageable behind said window frame upon rotation of the grommet relative to the window frame.

17. A window shade construction for a window having a generally rectangular window frame, said shade construction comprising: a pair of flexible cords running from top to bottom of said window and attached adjacent respective top and bottom ends of said window frame; substantial portions of said cords being locatable in a parallel and spaced apart condition adjacent and parallel to opposite lateral sides of said frame; a shade structure comprising a header movable toward and away from either of said ends of the frame, and a pleated shade member having one end coupled to said header; cord receiving means for mounting said shade member to said pair of cords generally at opposite sides thereof for relative slideable movement so as to be expandable and collapsible in accordion-like fashion relative to said cords; and mounting means coupled to said header for mounting said header for slideable movement along said cords and for directing said cords through said header and into said relative slideable engagement with said pleated shade member; said mounting means including engaging means for maintaining sufficient frictional engagement of said header with said cords for permitting said header to be set at a desired orientation along said cords relative to said window and for holding of said header in said desired orientation and against unintended movement relative to said cords in response to vibration or the like; and further including grommet means for attaching at least one end of one of said cords to said window frame, each of said grommet means comprising an elongate shank defining an axis, a relatively enlarged head having an aperture axially therethrough, said shank extending axially from said head through said window frame, said shank having an axial bore therethrough, an end portion of an associated cord extending axially through said head and said shank, and spring means disposed in said bore for maintaining said associated cord under tension.

* * * * *